United States Patent [19]
Nilsson

[11] Patent Number: 5,330,644
[45] Date of Patent: Jul. 19, 1994

[54] FILTER SECTOR

[76] Inventor: Bjarne Nilsson, Lanterngatan 9, S-462 55 Vänersborg, Sweden

[21] Appl. No.: 980,403

[22] Filed: Nov. 24, 1992

[30] Foreign Application Priority Data

Nov. 27, 1991 [SE] Sweden .............................. 9103515-4

[51] Int. Cl.⁵ ............................................ B01D 33/23
[52] U.S. Cl. .................................. 210/323.1; 210/324; 210/346; 210/486
[58] Field of Search ..................... 210/323.1, 324, 346, 210/486

[56] References Cited

U.S. PATENT DOCUMENTS

| | | | |
|---|---|---|---|
| 2,964,194 | 12/1960 | Olivier, Jr. et al. | 210/486 |
| 3,263,819 | 8/1966 | Schmidt et al. | 210/486 |
| 3,295,687 | 1/1967 | Schmerler | 210/486 |
| 3,917,534 | 11/1975 | Moore | 210/486 |
| 3,971,722 | 7/1976 | Radford | 210/486 |
| 4,686,040 | 8/1987 | Nilsson | 210/331 |
| 4,931,179 | 6/1990 | Nilsson | 210/331 |

FOREIGN PATENT DOCUMENTS

| | | | |
|---|---|---|---|
| 3986 | 6/1895 | Austria | 210/346 |
| 1051811 | 3/1959 | Fed. Rep. of Germany | 210/346 |
| 2407218 | 8/1975 | Fed. Rep. of Germany | |
| 894318 | 4/1962 | United Kingdom | |

Primary Examiner—Robert A. Dawson
Attorney, Agent, or Firm—Quarles & Brady; 10

[57] ABSTRACT

A filter sector for a filter disk of a rotating filter having a plurality of such filter sectors includes two spaced plate-shaped elements formed from a relatively thin material and defining main planes. Protrusions outwardly extend from the main planes and are shaped out of the material of the plate-shaped elements. The protrusions are adapted to keep a filter cloth at a distance from the main plane. Interior bulbs shaped out of the material of the plate-shaped elements extend from the interior sides of the plate-shaped elements. The protrusions and the interior bulbs have a material thickness substantially corresponding to the material thickness of the main plane. The interior bulbs are adjoined at engaging contact surfaces to provide strength and torsional rigidity to the sector.

9 Claims, 3 Drawing Sheets

FILTER SECTOR

FIELD OF THE INVENTION

The present invention concerns a filter sector for a filter disk of a rotating filter, said filter disk comprising a plurality of filter sectors and said filter sector including two spaced plate-shaped elements which are thin in comparison to the thickness of the filter sector and have a main plane. Protrusions outwardly extend from the main plane and are shaped in the material of the plate-shaped elements. The protrusions are adapted to keep a filter cloth at a distance from the main plane. The protrusions have a material thickness substantially corresponding to the material thickness of the main plane.

BACKGROUND OF THE INVENTION

A great variety of filter sectors are known as disclosed, for instance, by GB-A-894 318, DE-B-24 07 218, U.S. Pat. No. 3,917,534, U.S. Pat. No. 3,971,722, U.S. Pat. No. 4,686,040 and U.S. Pat. No. 931,179. In operation, such filter sectors are exposed to large external pressures tending to press the plate shaped elements towards each other.

According to GB-A-894 318, in order to prevent this and also otherwise stiffen a filter sector, a plurality of spacing means is inserted between two plate-shaped elements of a laminated material impregnated with synthetic resin, said spacing means being kept in place by rivets or the like, which keep the two plate-shaped elements together.

For the same purpose, according to DE-B-24 07 218, the two plate-shaped elements are internally provided with integrated corresponding, radially directed support cams abutting each other and penetrated by screws keeping the two plate-shaped elements, which are cast from metal, together.

In the filter sector according to U.S. Pat. No. 3,917,534, the plate-shaped elements are formed in one piece of a plastic material. Solid posts integrated with the elements and keeping the elements apart extend between the elements. Further, the space between the elements is filled with a hardening, foam plastic material which further prevents compression of the elements and provides the entire sector with increased stiffness.

U.S. Pat. No. 3,971,722 discloses a filter sector comprising two identical plate-shaped elements formed from a plastic material, preferably polyurethane. On the insides of the elements are integrated solid spacing means which, when mounting the two elements, are connected to each other in order to keep the elements apart and together against external and internal pressures, respectively.

In the filter sector according to U.S. Pat. No. 4,686,040, a plurality of ribs extend substantially perpendicularly to the radial direction and is arranged between the plate-shaped elements which are made of pressed metal plate which is thin in comparison to the thickness of the filter sector.

According to U.S. Pat. No. 4,931,179 the space between the two plate-shaped elements, which are made of pressed metal plate which is thin in comparison to the thickness of a filter sector, is filled with a hardened compound adhering to the plate-shaped elements and keeping them spaced from each other while providing the filter sector with increased rigidity against distortion.

Some of the solutions mentioned require significant work to be performed when mounting a filter sector, such as making holes, fitting of spacers and riveting of the rivets thereof (GB-A-894 318), making holes, fitting of screws and tightening thereof (DE-B-24 07 218), fitting of ribs and attachment thereof to the two plate-shaped elements (U.S. Pat. No. 4,686,040) and filling of the space between the plate-shaped elements with hardening compound (U.S. Pat. Nos. 3,917,534 and 4,931,179). In the solution according to GB-A-894 318 heat presses are also required for laminating the plate-shaped elements.

In other the solutions mentioned, expensive forms are required for casting (DE-B-24 07 218), or moulding the plate shaped elements (U.S. Pat. No. 3,971,722), or moulding a complete filter sector (U.S. Pat. No. 3,917,534). Further, the casting and moulding procedures are time consuming.

The present invention has its first object to provide a new solution to the problem of making a filter sector of the kind discussed above, in which the plate-shaped elements are thin in comparison to the thickness of the sector, resistant to compression of the two plate-shaped elements and rigid to other deformation.

Another problem associated with filter sectors, in which filtrate is introduced through holes in the plate-shaped elements into the space between the two plate-shaped elements to be discharged through an outlet, is that the volume of the space often is so great that filtrate therein does not leave the filter sector before it has rotated so far that filtrate flows back out through the filter cloth and re-wets filter cake deposited thereon.

In the filter according to U.S. Pat. No. 4,686,040 this problem is solved in that a certain volume of the space is shut off from the remainder by one of the ribs mentioned or in that a compound fills said volume of the space.

In the filter according to U.S. Pat. No. 4,931,179, the hardened compound provides filling of the volume of the space between the plate-shaped elements which is not used for a radial channel for leading to the outlet of the filter sector.

The present invention has as its second object to provide a solution to the problem of making the volume of space between the plate-shaped elements of a filter sector as small as possible.

SUMMARY OF THE INVENTION

In achieving these objects, the present invention uses relatively thin sheet material for the two plate-shaped elements, said material being deformable and weldable. The material is preferably acid proof, stainless steel plate, or alternatively, a suitable synthetic material which can be hot welded to itself or possibly glued.

A main characteristic of the invention is that the plate-shaped elements are provided on their insides with protrusions facing each other and corresponding to each other. The said protrusions preferably have flat abutting surfaces, by which the two plate-shaped elements are connected to each other, preferably by spot-welding. When manufacturing a filter sector according to the invention, flat sheet-shaped blanks, such as metal plates or plastic sheets of even thickness, are pressed in a known manner to form bulbs or extended ridges which keep the filter cloth spaced from the elements on the outside of the plate-shaped elements. At the same time, inwardly directed protrusions are pressed in the shape of bulbs having preferably flat crests. During the pressing operation, the material is stretched substantially only between the outwardly directed protrusions and the main plan, as well as between the inwardly directed protrusions and the main plane. This results in that the material in the flat crests of the protrusions maintain the same, or substantially the same, material thickness as the main plane of the blank, which remains flat after the pressing operation. This advantageously enables spot-welding between two inwardly directed protrusions.

BRIEF DESCRIPTION OF THE DRAWINGS

The invention is described hereinafter, reference being made to the accompanying drawings, wherein.

DETAILED DESCRIPTION OF THE PREFERRED EMBODIMENTS

Figure 1:
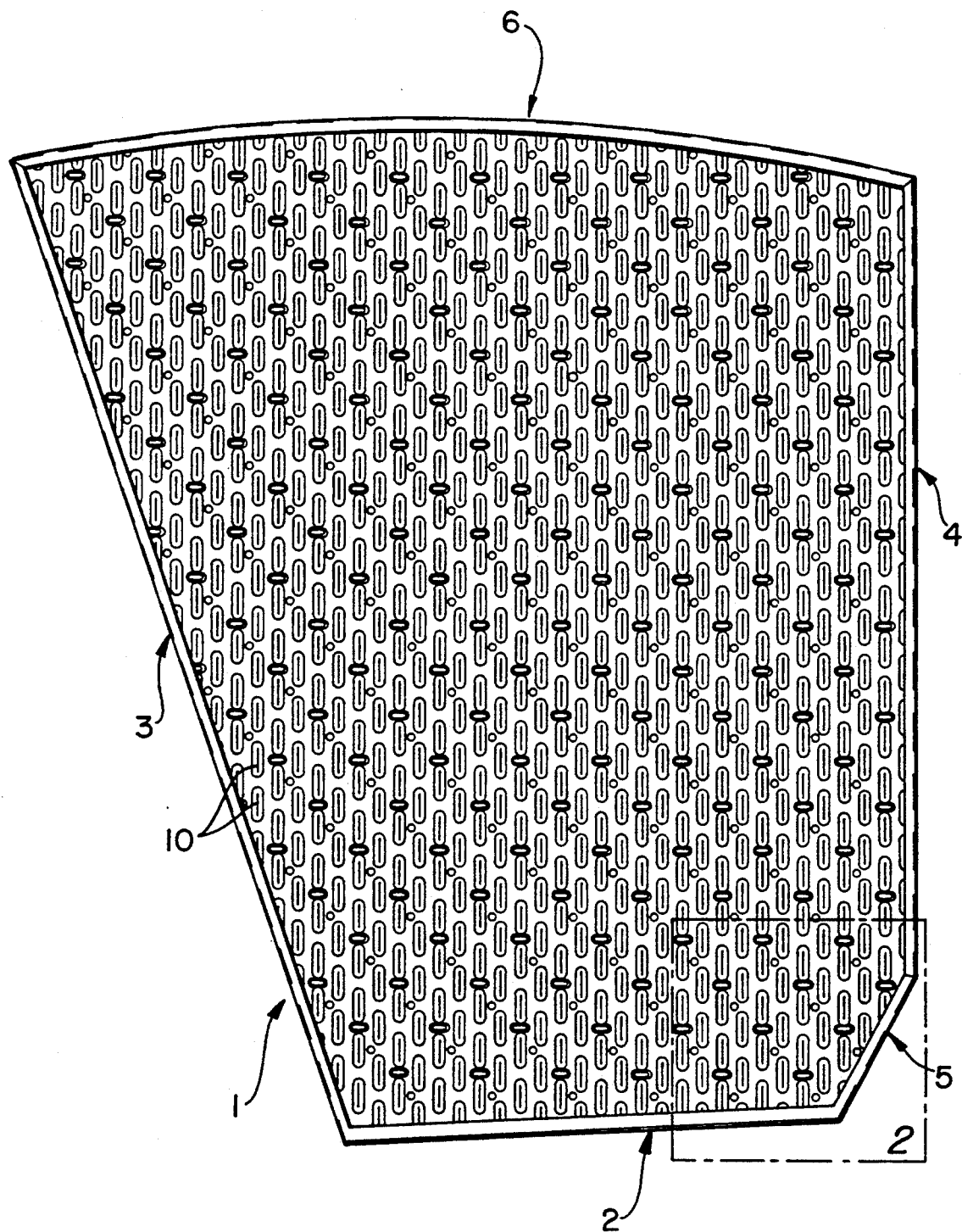
FIG. 1 is a plane view showing a filter sector according to the invention.
Figure 3:
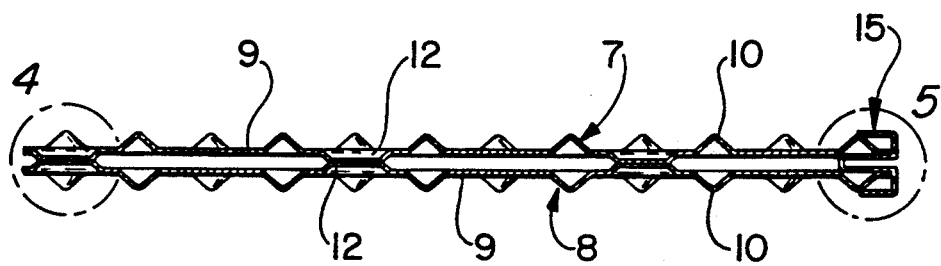
FIG. 3 is a section taken along line III—III of FIG. 2.
Figure 2:
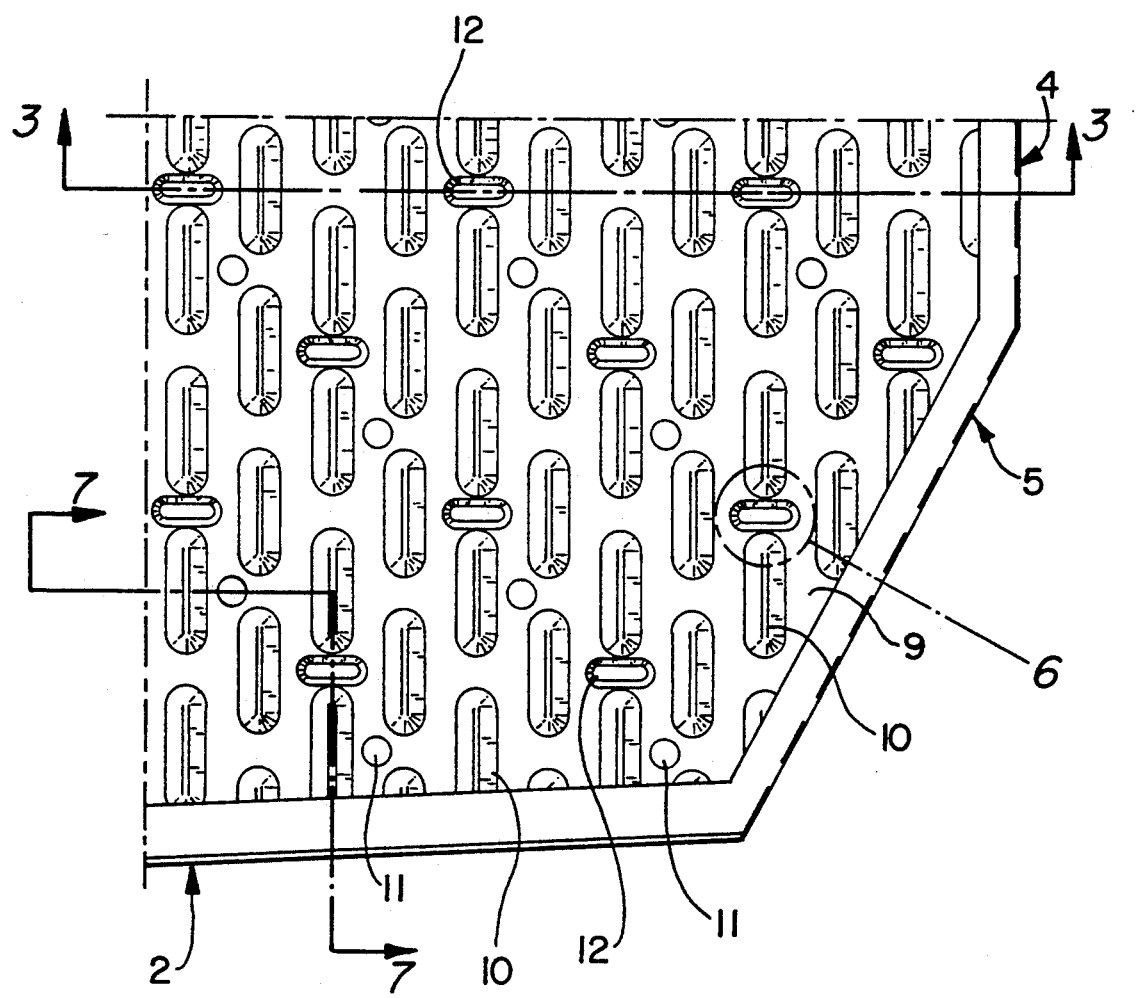
FIG. 2 at an enlarged scale shows section II of FIG. 1.

The filter sector 1 shown in FIG. 1 has shape of an "inclined" sector of a circle having a truncated apex. The radially inner end 2 of the sector 1 is an outlet end and is adapted to be connected to a not-shown filter rotor, such that filtrate can be brought from the sector 1 to an outlet for filtrate. Further, the filter sector 1 has two substantially radially limiting edges 3, 4, of which the edge 4 is obliquely cut at point 5 in order to provide space for a not-shown axial filtrate conduite of the kind shown for instance in U.S. Pat. No. 4,931,179. Radially outwards, the sector is limited by an arcuate outer edge 6. In a conventional manner the filter sector includes two plate-shaped elements 7, 8 (see FIG. 3) in the shape of relatively thin plates, which are images of each other and both have a large number of bulbs 10 protruding from the main plane 9 of the plates 7, 8. Said bulbs serve to keep a not-shown filter cloth or a corresponding filtering means spaced from the main plane 9. The bulbs 10 are evenly distributed over the surfaces or the plates 7, 8 and are interspaced in the radial direction as well as in the circumferential direction. In the embodiment shown, the bulbs 10 are oblong and extend substantially radially, but also other shapes are possible. Further, in the main plane 9 a number of holes 11 are provided in order to lead filtrate into the interior of the filter sector 1 to the space between the plates 7, 8.

According to the present invention, apart from the outwardly directed bulbs 10, the plates 7, 8 are provided with a number of inwardly directed bulbs 12 likewise evenly distributed over the main plane 9, herein denominated counter-bulbs. In the embodiment shown, the area distribution between the outwardly directed bulbs 10 and the counter-bulbs 12 is 4:1, the distribution in the radial direction as well as in the circumferential direction being 2:1.

Figure 4:
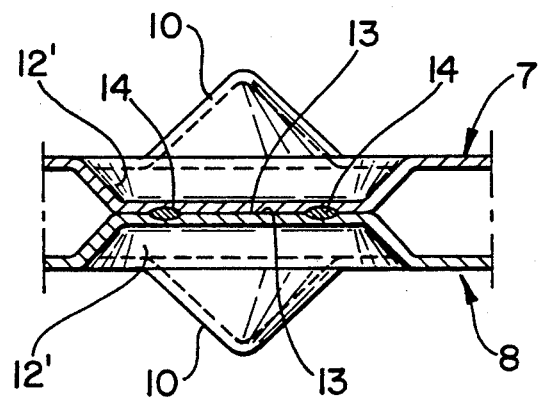
FIG. 4 at an enlarged scale shows detail IV of the section of FIG. 3.
Figure 7:
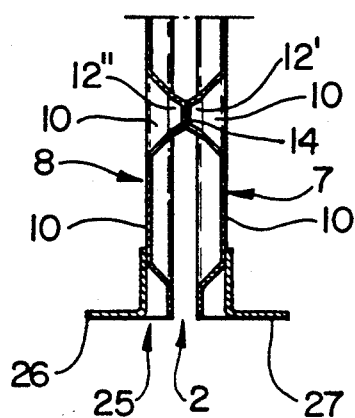
FIG. 7 at a larger scale than FIG. 2 shows a section taken after line VII—VII of FIG. 2.
Figure 6:
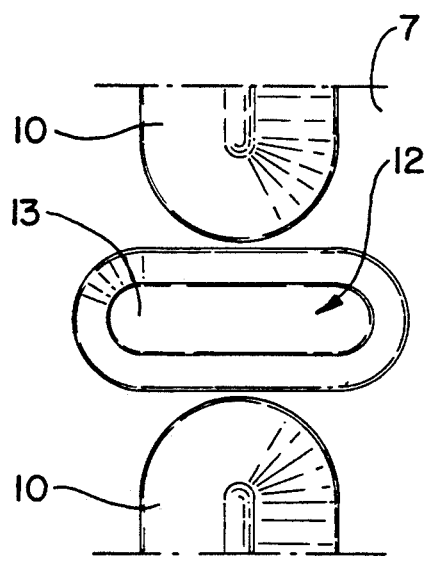
FIG. 6 at the same scale as FIGS. 4 and 5 shows detail VI of FIG. 2.

As most clearly appears from FIGS. 4 and 7, the counter-bulbs 12 are arranged such that each counter-bulb 12' of the plate 7 abuts a counter-bulb 12" of the plate 8. According to the invention, the abutment takes place with sufficient surface contact that the two plates 7, 8 may be spot-welded to each other in the contact surfaces. Advantageously, the counter-bulbs 12', 12" have flat defining surfaces 13 having such extension that spot-welding electrodes can easily be introduced, from the exterior of the filter sector to be assembled, into opposed counter-bulbs 12', 12". In the embodiment shown, the counter-bulbs 12', 12" are extended in the circumferential direction of the filter sector 1, such that each pair of abutting counter-bulbs 12 can be welded together with two or more spot-welds 14.

Due to the relatively closely distributed counter-bulbs 12 over the entire surface of the sector and the simple manner in which the counter-bulbs are formed simultaneously with the bulbs 10, as well as the simply achieved connection between the plates 7, 8 through the counter-bulbs 12, the filter sector according to the invention obtains, in a simpler manner than before, a great resistance against compression. The reason for this is the large number of counter-bulbs resulting in short distances between counter-bulbs in the radial direction as well as in the circumferential direction. This, in turn, for a given material thickness, results in less deflection of the main plane than if the counter-bulbs were more spaced from each other. Since the deflection of the main plane, thus, is minimized, the counter-bulbs can be made low without risking a total compression of the main planes of the two plates towards each other, which may result in choking of the filtrate flow within a filter sector. At the same time, the low bulb height results in that the interior volume of the filter sector can be kept small which is advantageous when the interior volume is used for discharge of filtrate. The large number of counter-bulbs also results in a large number of connection points between the plates, and, thus, the filter sector achieves a particular torsional stiffness.

In certain applications of the present invention, although not shown in the drawings, it may be advantageous to make the counter-bulbs in different heights, such that counter-bulbs at the outlet end of the filter sector are relatively high and counter-bulbs toward the opposed end have diminishing heights. This results in an increasing internal cross-sectional area of the filter sector towards the outlet end, corresponding to an increased filtrate flow towards the outlet end of the filter sector.

Figure 5:
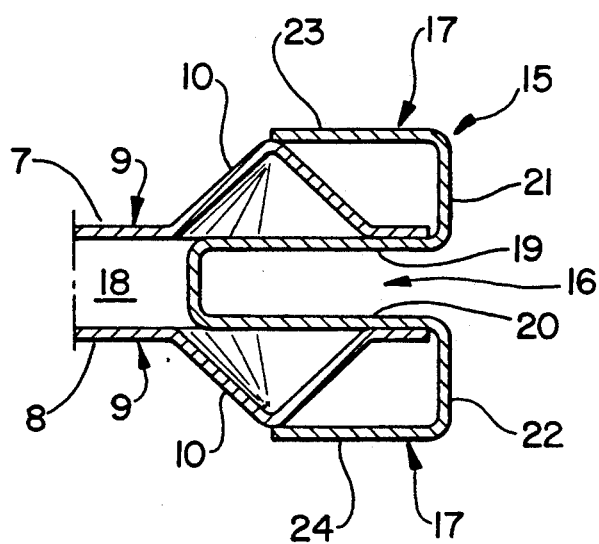
FIG. 5 at the same scale as FIG. 4 shows detail V of the section of FIG. 3.

Advantageously, an edge strip 15 having the cross-section shown in FIG. 5 can be utilized as a spacing means and interconnecting means between the plates 7, 8 at the edges 3–6 of the filter sector 1. The edge strip 15 comprises a substantially U-shaped intermediate portion 16 adapted to be introduced between the two plates 7 and 8 and two exterior portions 17 adapted to grip about the two plates 7, 8. The intermediate portion 16 comprises a web portion 18 the extension of which corresponds to the height of two counter-bulbs 12, i.e., the distance between the main planes 9 of the plates 7, 8. Two leg portions 19, 20 extend along the main plane 9 to the edge of the filter sector 1 where the exterior portions 17 start with leg portions 21, 22, respectively, directed from each other and turning into leg portions 23, 24, respectively, extended over the plates 7, 8 and resiliently pressing against the bulbs 10. The edge strip 15 is attached to the plates 7, 8 of the filter sector by spot-welding the leg portions 19, 20 of the intermediate portion against the main plane of the plates 7, 8 between bulbs 10.

As distinguished from conventional edge terminations of filter sectors, the edge strip 15 forms an "open" edge due to the fact that the intermediate portion extends in between the plates 7, 8. This provides the advantage that a possible connection between filter cakes of the two sector sides is more easily broken up at this location, which in turn brings about an improved removal of the filter cakes.

At the outlet end 2 of the filter sector 1, an outlet connection pieces 25 comprising two L-profiles 26 and 27 is provided. The profiles 26, 27 are welded to the plates 7, 8 and are designed for connection to the filter rotor previously mentioned.

Even if spot-welding herein has been stated as the preferred manner of interconnecting the counter-bulbs 12, it is understood that also other ways connection can be used to achieve many of the advantages of the invention, such as gluing, riveting or screwing.

I claim:

1. A filter sector for a rotating filter disk of a rotating filter, said filter disk comprising a plurality of filter sectors and each of said filter sectors including a first and a second spaced plate-shaped element formed from a sheet material having a relatively thin material thickness, said elements forming between them an interior drainage space for filtrate, each element having a main plane having said relatively thin material thickness, said main plane being provided with perforations to direct filtrate to said interior drainage space, protrusions shaped in said material extending outwardly from said main plane and being adapted to keep a filter cloth at a distance from the main plane, each of said protrusions having outwardly directed walls and a top wall defining a cavity open towards said interior drainage space, and said walls having a material thickness substantially corresponding to said relatively thin material thickness, wherein said plate-shaped elements are further provided with bulbs shaped in said material and extending inwardly from said main plane into said interior drainage space, each of said bulbs having inwardly directed walls and a flat top wall defining a cavity open towards the exterior of said filter sector, said inwardly directed walls and said flat top wall having a material thickness substantially the same as said relatively thin material thickness, and said flat top wall of each bulb of said first plate-shaped element abutting a flat top wall of a bulb of said second plate-shaped element and being positively connected thereto.

2. The filter sector according to claim 1, wherein each pair of interconnected bulbs is welded together with a spot weld.

3. The filter sector according to claim 2, wherein said bulbs and their flat top walls are oblong, each pair of bulbs being welded together with more than one spot weld.

4. A filter sector for a filter disk of a rotating filter, said filter disk comprising a plurality of filter sectors and said filter sector including two spaced plate-shaped elements formed from a material having a relatively thin material thickness, each element having a main plane from which outwardly extend protrusions shaped in said material and adapted to keep a filter cloth at a distance from the main plane, said protrusions having a material thickness substantially corresponding to said material thickness of the main plane, wherein said plate-shaped elements interiorly provide bulbs formed in said material of the elements, said bulbs being directed towards each other and abutting each other with contact surfaces, said bulbs having material thickness substantially corresponding to said material thickness of said elements, wherein an edge strip is used as spacing means and interconnecting means between plate-shaped elements at least one edge thereof, said edge strip having a cross-sectional profile including a substantially U-shaped intermediate portion adapted to be introduced between the two plate-shaped elements and having a web portion and two leg portions extending therefrom under substantially right angles, and two exterior portions with respective first leg portions directed from each other and extending from the leg portions of the intermediate portion, each first leg portion turning into a second leg portion of the intermediate portion, said second leg portion extending over a respective one of the leg portions of the intermediate portion, said web portion of said intermediate portion having an extension between its leg portions corresponding to the sum of the heights of two bulbs.

5. The filter sector according to claim 4, wherein each of the first leg portions of the exterior portions has an extension between the respective leg portion of the intermediate portion and the associated second leg portion corresponding to the height of an exteriorly directed protrusion.

6. The filter sector according to claim 5, wherein the second leg portions of the exterior portions extend over and abut against protrusions of a respective one of the two plate-shaped elements when the intermediate portion is introduced between the two plate-shaped elements.

7. The filter according to claim 6, wherein the leg portions of the intermediate portion are welded to the two plate-shaped elements (7,8) in the main planes (9) thereof.

8. The filter sector according to claim 4, wherein the second leg portions of the exterior portions extend over and abut against protrusions of a respective one of the two plate-shaped elements when the intermediate portion is introduced between the two plate-shaped elements.

9. The filter sector according to claim 8, wherein the leg portions of the intermediate portion are welded to the two plate-shaped elements (7,8) in the main planes (9) thereof.

* * * * *